A. J. DAVIS.
STOCK FEEDER.
APPLICATION FILED APR. 17, 1920. RENEWED JUNE 15, 1922.

1,423,915. Patented July 25, 1922.

Inventor
Arthur J. Davis
By J. M. St. John
Atty.

UNITED STATES PATENT OFFICE.

ARTHUR J. DAVIS, OF CEDAR RAPIDS, IOWA.

STOCK FEEDER.

1,423,915.  Specification of Letters Patent.  Patented July 25, 1922.

Application filed April 17, 1920, Serial No. 374,545. Renewed June 15, 1922. Serial No. 568,583.

*To all whom it may concern:*

Be it known that I, ARTHUR J. DAVIS, a citizen of the United States, residing at Cedar Rapids, in the county of Linn and State of Iowa, have invented certain new and useful Improvements in Stock Feeders, of which the following is a specification.

This invention relates to the feeding of farm animals, especially hogs, and the object of the invention is to provide a simple feeding apparatus which may be stocked with a supply of food in bulk, and by the natural action of the animals in feeding, a proper quantity of food is allowed to each automatically.

The invention is fully disclosed in the description and claims following, reference being had to the accompanying drawing, in which:—

Figure 1:
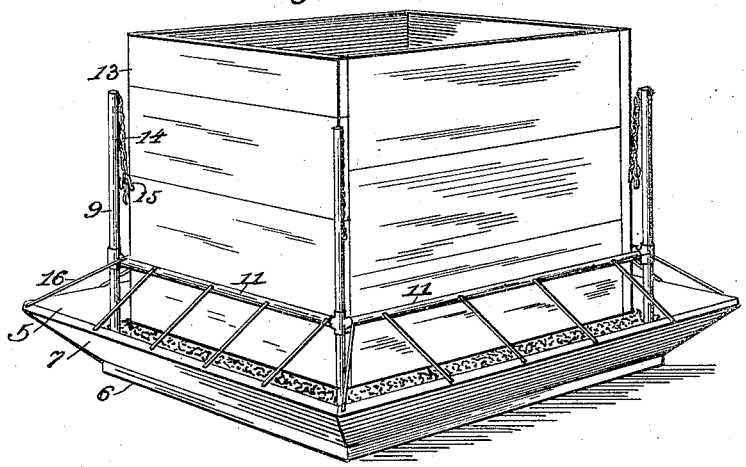
Figure 2:
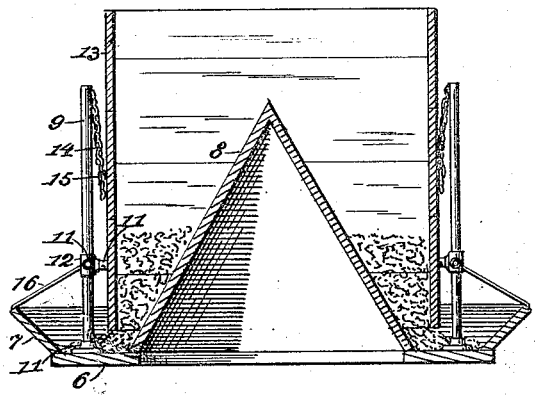

Fig. 1 is a view in perspective of a stock-feeder embodying my invention. Fig. 2 is a central, vertical section of the same.

The device is herein shown in rectangular form, to give the animals access to it on all four sides, but the form may of course be varied according to taste or circumstances. In the drawing, the numeral 5 denotes a rectangular feeding trough, comprising bottoms 6, flaring sides 7, and a central, pyramidal structure 8, which serves as the inner sides of the trough, and as a distributer of food thereto. Near each corner of this quadrangular trough is secured a standard 9, which in practice is made of gas-pipe screwed into floor-plate 10, which is fastened to the bottom-board. The four standards are tied together and braced by cross-rods 11 screwed into T's 12. These rods may be solid, or tubular, as desired. Inside of the standards, and at a little distance from them, especially at the bottom, is suspended the food magazine 13, here shown as a square box, open at the top and bottom. The magazine is hung from each corner by a chain 14 attached to the upper end of each standard, the magazine being provided with hooks 15 to engage the links of the chains. By this means the magazine may be adjusted to any desired height so as to allow the proper flow of food to the troughs under its bottom edges, whatever the character of the food may be. The chains also permit the magazine to swing a limited distance, whereby its contents are agitated, clogging is prevented, and the material is kept flowing to the trough as fast as it is consumed. This swing of the magazine is produced by the nosing and rooting action of the hogs themselves in searching for more food as that in the accessible part of the trough is exhausted. This, when the height of the magazine is properly adjusted, supplies the animals with all the food they need, but avoids all waste. In practice the feeder is found to be adaptable to any kind of dry food, from corn on the cob to mill products.

To prevent undue crowding of the animals sidewise, divider rods 16 are provided, attached at their outer ends to the edges of the trough, and at their inner ends to the tie-rods 11.

Having thus described my invention, I claim:

1. In a stock-feeder, a continuous quadrangular trough, an inside pyramid to divert food thereto, standards adjacent to the corners of the pyramid, a magazine surrounding said pyramid and spaced away therefrom at the bottom, and flexible and adjustable means for suspending the magazine, connecting each corner thereof with an adjacent standard.

2. In a stock-feeder, a continuous, quadrangular trough, an inside pyramid to divert food thereto, standards adjacent to the pyramid, chains attached thereto, and a magazine spaced away from the standards, with its bottom edges depending into the trough, and provided with hooks to connect with said chains.

3. In a stock-feeder, a continuous, circumferential trough, an inside pyramidal structure to divert food thereto, standards adjacent to the pyramid, connecting tie and brace-rods therefor, an external magazine provided with suspending hooks, and chains connecting with the standards, and adjustably connectable with said hooks.

4. In a stock-feeder, the combination of a quadrangular trough, a corresponding food magazine depending therein, standards adjacent to each corner of the magazine, but spaced away therefrom, flexible means connecting each standard with a corner of the magazine, tie-rods connecting the standards outside the magazine, and divider-rods from the outer edges of the trough to the tie-rods.

In testimony whereof I affix my signature in presence of two witnesses.

ARTHUR J. DAVIS.

Witnesses:
J. M. ST. JOHN,
F. W. ARMSTRONG.